June 6, 1950 L. W. CURRIER, JR 2,510,866
COOKING MACHINE
Filed April 30, 1949 7 Sheets-Sheet 1

Inventor:
Leslie W. Currier, Jr.
By Emery Booth, Townsend, Miller & Neiduck
Attys

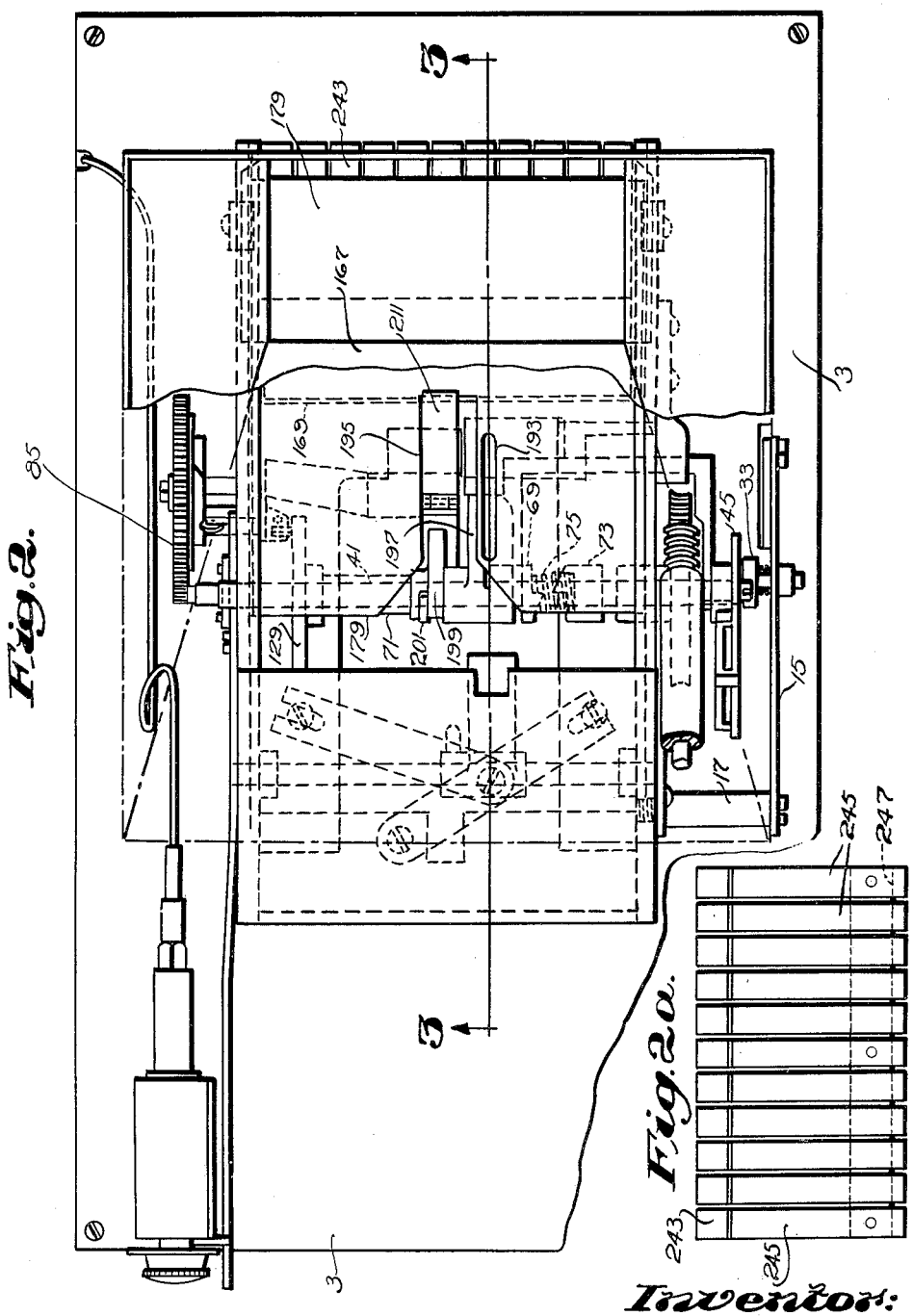

June 6, 1950 L. W. CURRIER, JR 2,510,866
COOKING MACHINE
Filed April 30, 1949 7 Sheets-Sheet 3
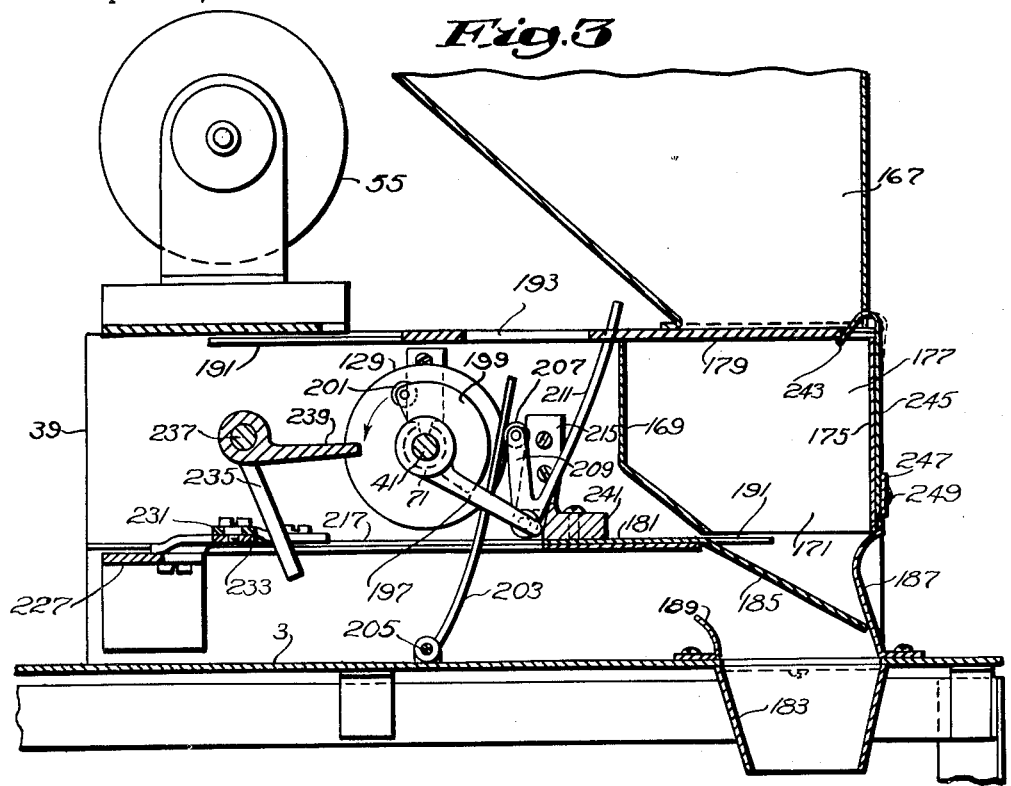
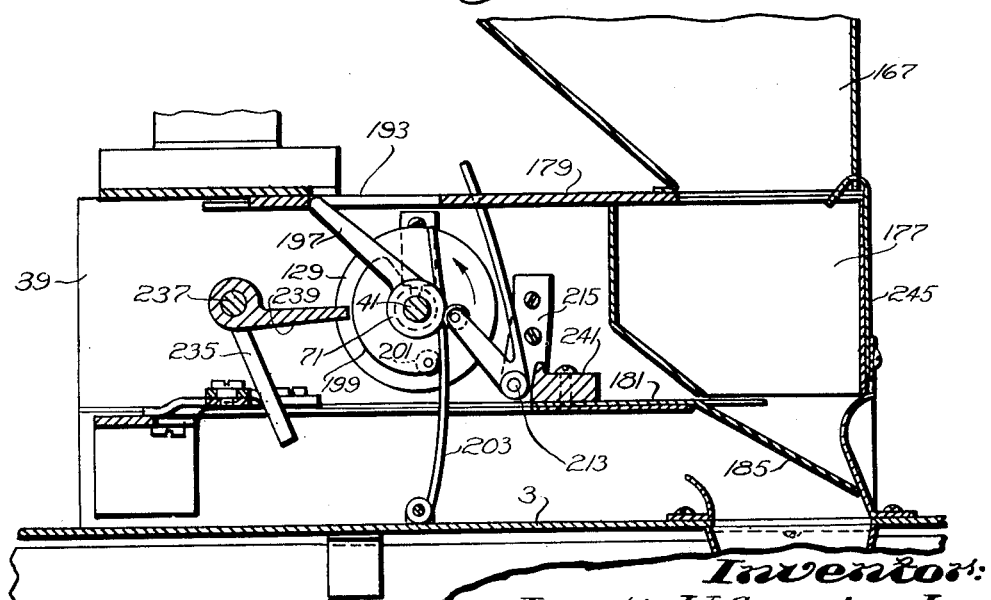
Inventor:
Leslie W. Currier, Jr.
by Emery, Booth, Townsend, Miller & Weidner
Attys

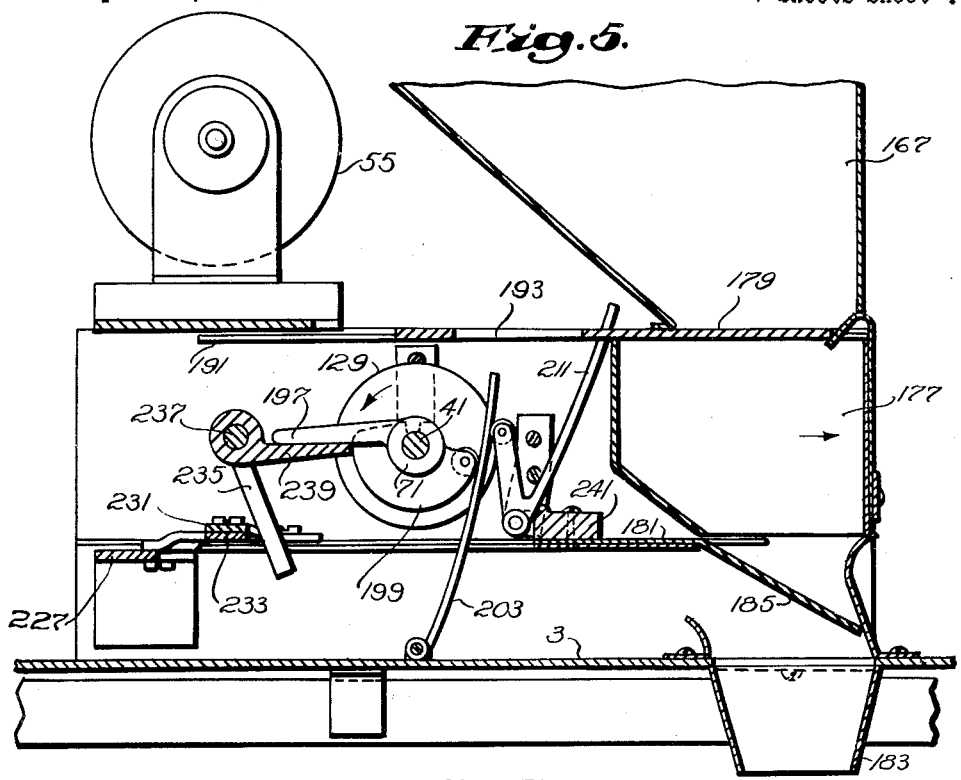
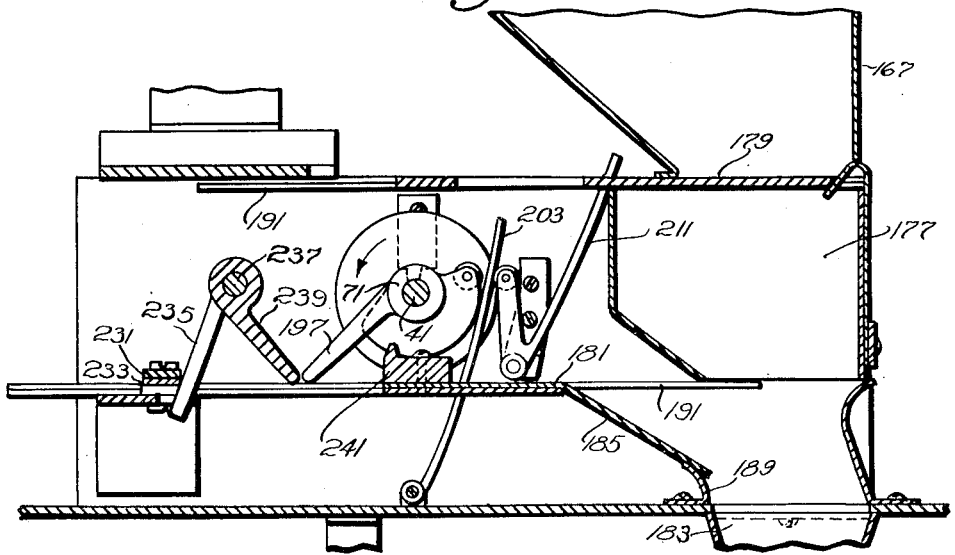

June 6, 1950 L. W. CURRIER, JR 2,510,866
COOKING MACHINE
Filed April 30, 1949 7 Sheets-Sheet 5
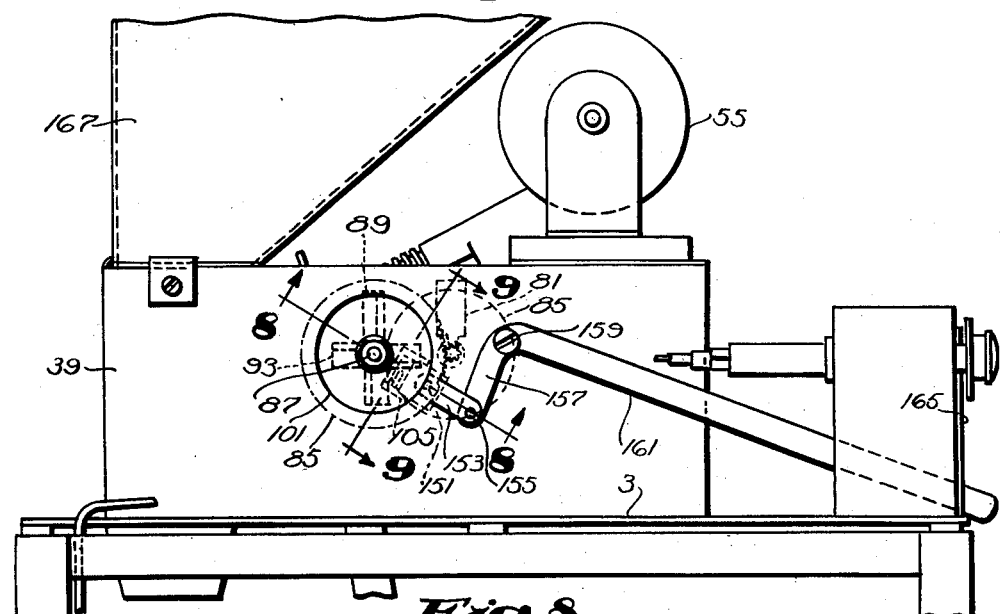
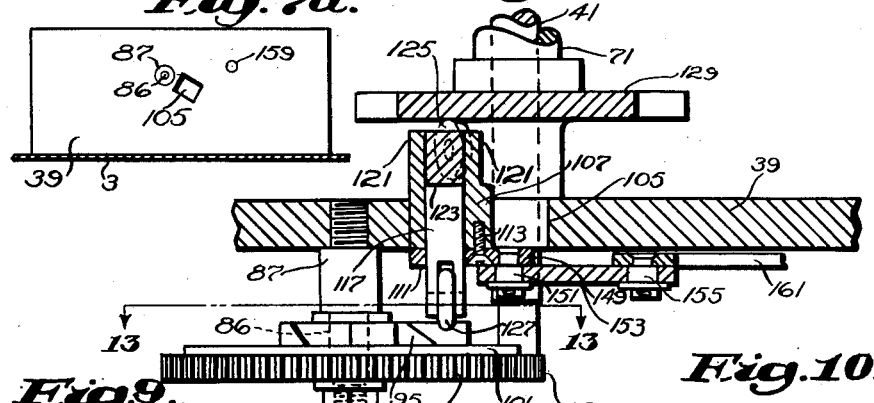
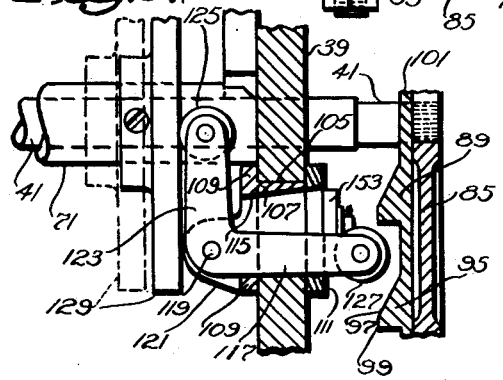
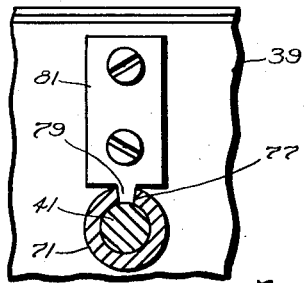
Inventor:
Leslie W. Currier, Jr.

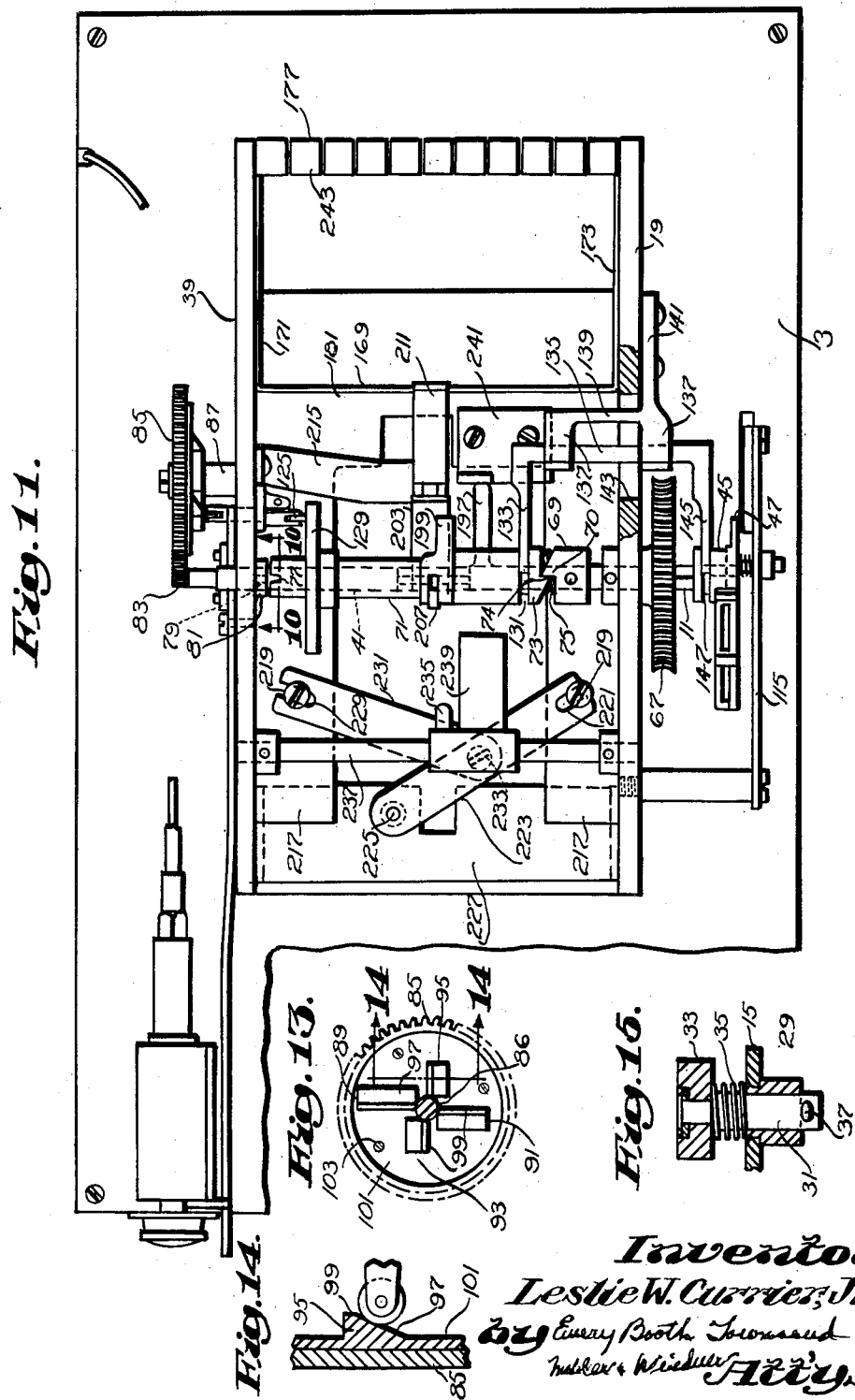

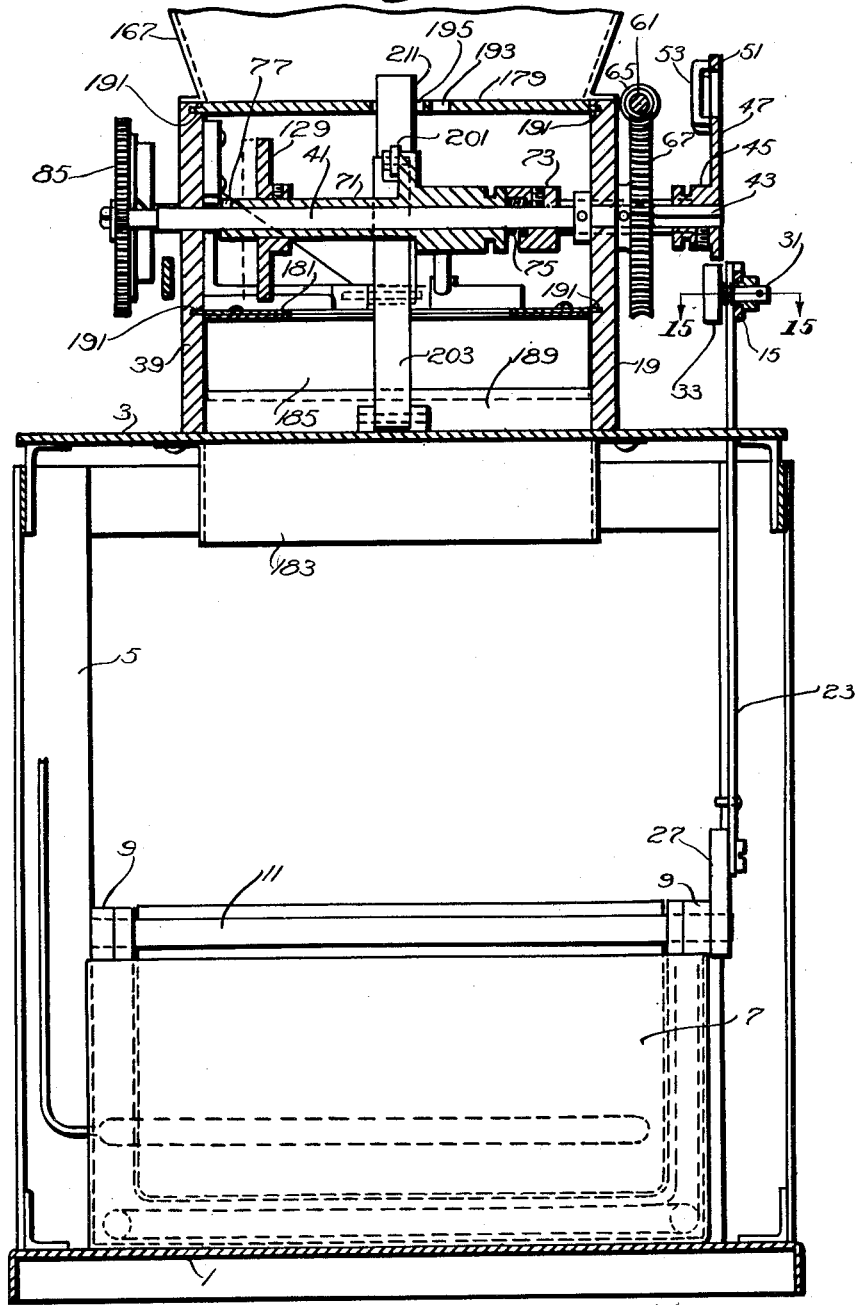

Patented June 6, 1950

2,510,866

UNITED STATES PATENT OFFICE 2,510,866

COOKING MACHINE

Leslie W. Currier, Jr., Kingston, N. H.

Application April 30, 1949, Serial No. 90,605

18 Claims. (Cl. 99—407)

My invention relates to cooking machines, particularly but not exclusively to one adapted for cooking nuts, the invention being an improvement in that disclosed in my pending application Serial Number 748,315, filed May 15, 1947.

The invention has among its objects a cooking machine provided with improved means for entering and removing the articles to be cooked into and from the cooking medium, with provision for varying at the will of the operator the duration of the cooking period. These and other objects of the invention will be best understood from the following description when read in the light of the accompanying drawings of an embodiment of the invention selected for illustrative purposes, while the scope of the invention will be more particularly pointed out in the appended claims.

In the drawings:

Fig. 2 is a plan of the machine according to Fig. 1, with the rotary parts in a slightly different operative position, and with parts broken away;

Fig. 2a illustrates a detail of the machine;

Fig. 3 is a section on the line 3—3 of Fig. 2, with the rotary parts in their operative position shown by Fig. 2, and with parts broken away and parts omitted;

Figs. 4, 5 and 6 are views corresponding to Fig. 3 with the parts in different operative positions;

Fig. 7 is a fragmentary elevation of the machine as viewed from the top of Fig. 2, that is to say, from the opposite side of the machine from Fig. 1, with parts broken away and parts omitted;

Fig. 7a illustrates a detail of the machine on a reduced scale;

Figure 1:
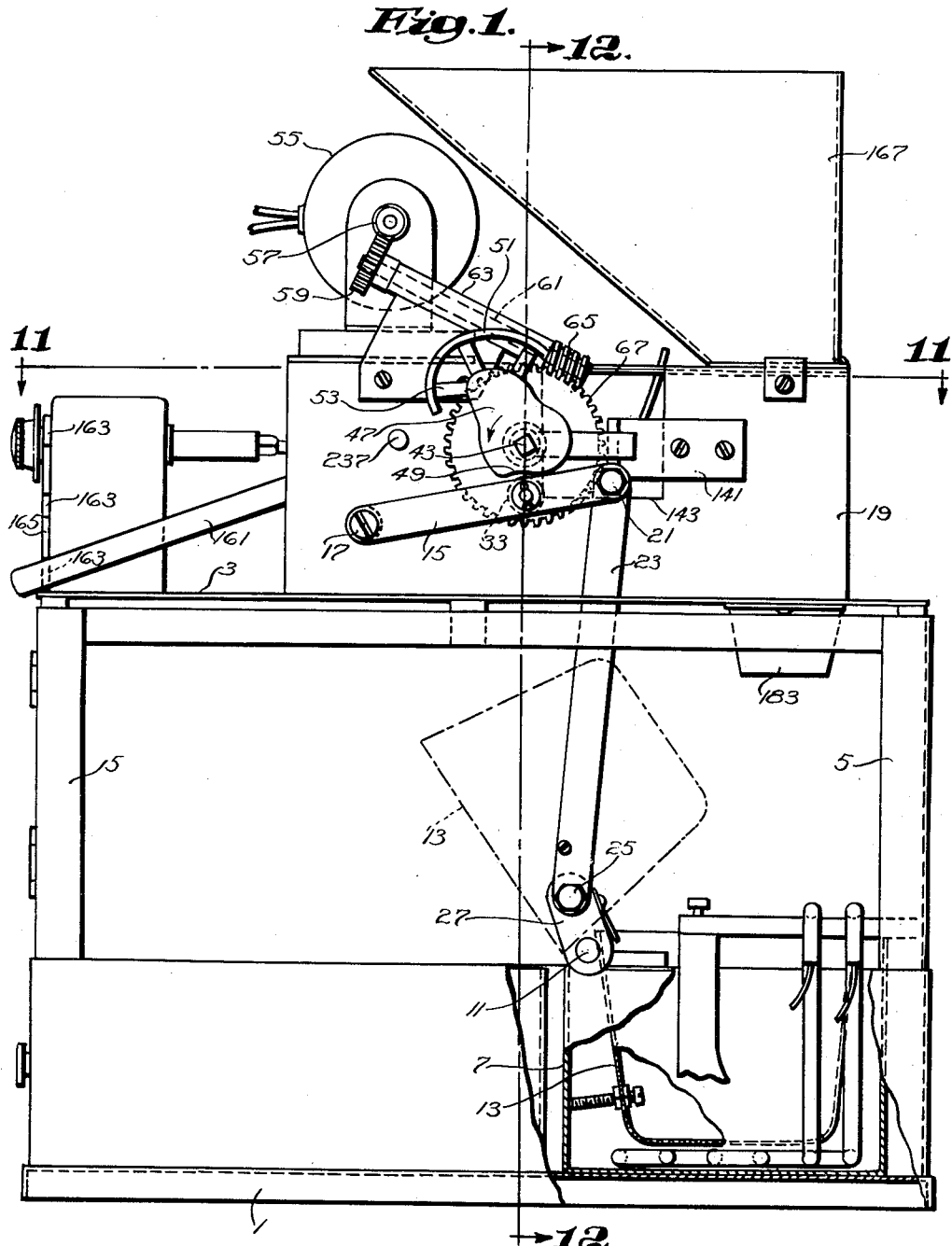
Fig. 1 is a side elevation of a cooking machine according to the invention, with parts broken away and parts in section.

Figs. 8 and 9 are, respectively, sections on the lines 8—8 and 9—9 of Fig. 7 on an enlarged scale;

Fig. 10 is a section on the line 10—10 of Fig. 11 on an enlarged scale, with parts omitted;

Figs. 11 and 12 are, respectively, sections on the lines 11—11 and 12—12 of Fig. 1;

Fig. 13 is a section on the line 13—13 of Fig. 8 on a reduced scale, with parts omitted;

Fig. 14 is a section on the line 14—14 of Fig. 13; and

Fig. 15 is a section on the line 15—15 of Fig. 12 on an enlarged scale, with parts omitted.

Referring to the drawings, the machine illustrated comprises a base 1 above which is positioned a platform 3 supported on said base by the posts 5. Supported on the base is a container 7 (Figs. 1 and 12) for hot cooking liquid. Carried by the container at opposite ends thereof adjacent one of its longitudinal edges are bearings 9 which support a rock shaft 11. Fixedly carried by the rock shaft is a foraminous basket 13 for the nuts or other articles to be cooked. By moving the rock shaft in one direction of its oscillation the basket may be moved from its full line position shown by Fig. 1, in which position the nuts are cooked, to its dotted line position shown by that figure, in which latter position the contents of the basket are dumped. By moving the rock shaft in the opposite direction of its oscillation the basket may be returned from said dotted line position to said full line position, a batch of nuts or other articles to be cooked being charged into the basket while it is being so returned.

The basket rock shaft 11 is oscillated by a swinging lever 15 pivotally supported at one end thereof on a pin 17 carried by a vertically extending side plate 19 secured at its lower edge, preferably by welding, to the plateform 3, which latter supports it. Pivotally secured to the free end of the swinging lever at 21 is the upper end of a link 23, the latter at its lower end being pivotally connected at 25 to the outer end of a crank 27 fixedly carried by the basket rock shaft 11. When the lever 15 is in its position shown by Fig. 1 the basket will be in its full line position shown by that figure. By swinging the lever downward from its position shown by Fig. 1 the basket will be moved to its dotted line position shown by that figure.

As shown (see Figs. 1, 12 and 15) the lever 15 fixedly carries a boss 29 provided with a perforation in which is rotatably mounted a pin 31 slidable longitudinally in said perforation. At one end, in spaced relation to the lever, the pin carries a roller 33, a compression spring 35 being interposed between the roller and lever for yieldingly retaining the parts in the position shown by Fig. 15. A cotter pin 37, carried by the pin at its end opposite the roller, retains it against removal from the perforation in the boss 29.

Rotatably mounted adjacent one of its ends in the side plate 19, and adjacent its opposite end in the opposite side plate 39, is a rotary shaft 41 (Figs. 11 and 12), the portion 43 of the shaft which projects beyond the side plate 19 being squared (Figs. 1, 11 and 12) and serving to spline to the shaft the hub 45 of a cam 47. Normally the cam is in a vertical plane at one side of the roller 33 on the lever 15 as shown in Fig. 2, the cam, which continuously rotates with the shaft 41, thus normally being ineffective to engage said roller. However, by sliding the cam outward along the shaft it may be brought over the roller, as shown in Fig. 12, whereupon the cam is effective to engage the roller and oscillate the swinging lever 15 for operating the basket through its cycles of movements.

In a manner hereinafter explained the continuously rotating cam 47 is slid along the shaft 41, from its position relative to said shaft shown by Fig. 2 to its position relative to said shaft shown by Fig. 12, when the cam is in such angularly displaced position from that shown by Fig. 1 that it is directly behind the roller 33 as viewed in Fig. 1. This causes the outer vertical side of the cam when so slid to bear against the end of the roller remote from the lever 15 and push the roller toward that lever against the resistance of the spring 35. As the cam continues to rotate it slides over this end of the roller, with which its said vertical side is in contact, until the depressed portion 49 of the cam moves opposite the roller, whereupon the spring 35 will snap the roller under the peripheral edge of the cam to place the parts in their positions shown by Figs. 1 and 12, and then the cam by continuing to rotate in the direction of the arrow shown by Fig. 1 will cooperate with the roller to oscillate the lever 15 for raising and lowering the basket. When continued rotation of the cam through one revolution again brings the depressed portion 49 thereof opposite the roller the cam in a manner hereinafter described is slid along the shaft 41 to return it to its position relative to said shaft shown by Fig. 2, so that the basket will not again be operated until the cam is again slid along the shaft to return it to its position in which its peripheral edge again engages the roller.

As shown, the cam carries in spaced relation to its peripheral edge a track 51 supported on the cam by the arms 53 each secured at one end to the cam and at its opposite end to the track. This track serves to hold the roller from moving away from the cam when the basket is descending toward the container, as the weight of the basket in absence of the track would move the roller away from the cam.

The shaft 41 is driven by a continuously operating motor 55 carried by the side plates 19 and 39. This motor is connected by a wormwheel 57 and a worm 59 to one end of a lay shaft 61 for driving the latter, the shaft 61 being mounted in a bearing 63 carried by the side plate 19. At its lower end the shaft 61 carries a worm 65 which meshes with a wormwheel 67 fixed to the shaft 61. On the shaft 41 is fixedly secured the element 69 (Fig. 11) of a jaw clutch provided with a single jaw 70, and freely mounted on said shaft is a sleeve 71 which carries the cooperating element 73 of said clutch, this element having a single jaw 74. Interposed between the two clutch elements 69 and 73 is a spring 75 (Figs. 2, 11 and 12) which tends to slide the sleeve away from the clutch element 69 to hold the two clutch elements out of engagement, as shown by Fig. 2.

As shown, the sleeve 41 at its end opposite the clutch element 73 is formed with a notch 77 (Figs. 10, 11 and 12) which, as shown by Fig. 10, is adapted to receive a lug 79 at the end of a block 81 fixedly carried by the side plate 39, for normally holding the sleeve against rotation. When the sleeve is slid along the shaft in a manner hereinafter described, to cause the clutch elements to engage, the notch 77 in the sleeve will be drawn from engagement with the lug 79, as shown by Fig. 11, to permit the sleeve to rotate with the shaft. When the sleeve is so rotated the spring 75 causes the extreme end of the sleeve adjacent the lug 79 to bear against it, and when the rotating sleeve makes one revolution to cause the notch to register again with the lug the spring will cause the notch and lug to snap into engagement and disengage the two clutch elements.

The end of the shaft 41 which projects beyond the side plate 39 carries a pinion 83 which meshes with a gear 85, this gear being rotatably supported on the reduced end portion 86 (Fig. 8) of a pin 87 carried by that side plate. At its side facing the side plate the gear is shown as carrying four radially extending cams 89, 91, 93 and 95 (Fig. 13), these cams rotating with the gear, and, as shown in Fig. 14, having inclined faces 97 and flat apex portions 99 of narrow width, these apex portions of the four cams being in quartering relation with each other, as shown by Fig. 13. As shown, the cams are formed as an integral part of a circular plate 101 secured to the gear in any suitable manner as, for example, by screws 103, which preferably have flat heads recessed into the plate.

As shown, the side plate 39 is formed with an upwardly inclined rectangular opening 105 (Figs. 7, 7a, 8 and 9) in which is slidably mounted a block 107. This block is retained in the opening 105 by the flanges 109 formed integrally with the block and coacting with the inner side of the side plate 39, and by a plate 111 secured to the block by screws one of which is shown at 113 (Fig. 8), opposite edge portions of this plate 111 overlapping the outer side of the side plate 39 opposite the flanges 109. As shown, the block is formed with a through perforation 115 through which extends one leg 117 of a bell crank lever positioned between and pivoted at 119 to lugs 121 formed integrally with the block and projecting therefrom at the inner side of the side plate 39. The other leg 123 of the bell crank lever extends vertically upward and at its free end carries a roller 125, while the other leg 117 of the bell crank lever at its end projecting from the block at the outer side of the side plate 39 carries a roller 127. The roller 127 is adapted to be intermittently engaged by the four cams carried by the gear 85 so as to swing the leg 117 of the bell crank lever upward, as viewed in Fig. 9, about its pivotal connection 119 to the block 107, this swinging the leg 123 of the bell crank lever to the left as viewed in Fig. 9. The roller 125 cooperates with a disk 129 fixedly carried by the sleeve 71 on the shaft 41 so that when the bell crank lever is so operated by the cams on the gear 85 the disk will be pushed from its full line position shown by Fig. 9 to its dotted line position shown by that figure, this dotted line position corresponding to the full line position of the disk in Figs. 11 and 12. The sleeve 71, being fixed to the disk, moves with it to cause the clutch elements 69 and 73 of Fig. 11 to engage. The parts are so designed that the sleeve 71 is so shifted before the jaw 70 of the clutch element 69 is in rotative position to engage with the jaw 74 of the clutch element 73 on the sleeve, so that the sleeve is not rotated by the shaft 41 until after the notch 77 on the sleeve is entirely disengaged from the lug 79 normally holding the sleeve from rotation.

As shown (see Fig. 11), the sleeve 71 adjacent the clutch is formed with an annular circumferential groove 131 into which fits the free end of an arm 133 of a shift rod 135 mounted for reciprocation in the arms 137 of a bracket 139, the base 141 of the bracket being secured to the outer side of the side plate 19, and the body of the bracket extending through an opening 143 formed in said plate. At its end opposite the arm 133 the shift rod carries an arm 145 the free end of which is received in an annular circumferential groove 147 formed in the hub 45 of the basket operating cam 47. By this construction, when the sleeve is shifted as above described, the cam is slid outward of the shaft to press the outer vertical side face of the cam against the adjacent end of the roller 33 on the lever 15, so that said roller will snap under the cam in position to be engaged by the peripheral edge of the cam when the parts are in the position shown by Fig. 1, as hereinbefore explained.

As a consequence of the above construction, when any of the cams 89, 91, 93 and 95 of the continuously rotating gear 85 operates the bell crank lever 117, 123 to shift the sleeve 71, the basket operating cam 47 will be shifted to move the basket through its cycle. The parts are so further designed that the sleeve 71 begins to rotate while the roller 127 is on the flat apex portion 99 of the cam on the gear 85, so that when continued rotation of that gear causes the cam to move out of contact with the roller the spring 75 of the clutch 69, 73 will slightly shift the sleeve upward, as viewed in Fig. 11, to cause the end of the sleeve to bear against the adjacent side of the lug 79 on the plate 81 without disengaging the jaws 70, 74 of the clutch, which causes the sleeve to continue to rotate through one revolution until the notch 77 in the sleeve again moves into registry with the lug 79, whereupon the spring 75 snaps the sleeve upward, as viewed in Fig. 11, to cause the cam 47 to be moved from above the roller 33 on the basket operating lever, as has been heretofore described. During this revolution of the cam, the basket, as above explained, moves through its cycle of operations, the basket remaining in the cooking liquid until the basket is again caused to move through its cycle by reason of the next successive cam on the gear 85 causing the cam 47 to shift to move the basket through its next successive cycle. The interval elapsing between operations of the bell crank lever by successive cams on the gear 85 determines the time the articles charged to the basket remain in the cooking liquid, and therefore determines the length of time said articles are cooked.

As shown in Fig. 8, the plate 111 attached to the block 107 which carries the bell crank lever 117, 123 is formed at one end with a lug 149 to which is pivoted, at 151, one end of a link 153. The other end of this link is pivotally connected, at 155, to the free end of an arm 157 (Fig. 7) of a bell crank lever, which latter is pivotally mounted on the outer side of the side plate 39 at 159. The other arm 161 of this bell crank lever serves as a handle for swinging the bell crank lever so as to slide the block 107 longitudinally of the opening 105 in the side plate 39. This sliding of the block is effective to position the roller 127 of the bell crank lever 117, 123 in different positions radially of the gear 85. The free end of the arm 161 of the bell crank lever employed for so moving the block cooperates with notches 163 (Fig. 1) formed in the edge of a vertically extending plate 165 fixedly carried by the platform 3, the arm being laterally resilient and sliding over that edge so that it will snap into the notches when brought into registry with them. In this way the block 107 is releasably held in its adjusted positions. When the block is moved to position the roller 127 at its maximum distance from the axis of the gear 85 only the radially longer cam 89 will be effective to operate the bell crank lever 117, 123. Consequently, under such conditions, the bell crank lever will be operated only once for each revolution of the gear 85. When the block is moved to an intermediate position lengthwise of the opening 105 the roller 127 will be in the path of the cam 91 on that gear as well as in the path of the cam 89. Hence under these latter conditions the bell crank lever will be operated twice during each revolution of the gear 85. When the block is shifted to position it at its minimum distance from the axis of the gear 85 the roller 127 will be in the path of all four cams on the gear and hence will be operated four times during each revolution of the gear. The parts are designed, for example, so that the gear 85 makes one revolution in about six minutes. With such a rate of revolution of the gear the motion of the basket through its cycle may be initiated every six minutes, or every three minutes, or every minute and a half, to vary the time of cooking the articles, the basket in each instance moving through its cycle in a constant time say, for example, about forty seconds.

The articles such as nuts to be cooked are stored in the hopper 167. Below the hopper the side plates 39 and 19 carry a metal sheet bent to form the side walls 169, 171, 173 and 175 (Figs. 3 and 11) so as to form a chamber 177 for receiving nuts discharged from the hopper. Entrance of nuts to this chamber is controlled by an upper sliding valve 179, and discharge of the nuts from the chamber is controlled by a lower sliding valve 181. When the valves are in their positions shown by Fig. 4 the upper valve 179 is open and the lower valve 181 is closed. Consequently the chamber will be filled with nuts from the hopper, after which the valve 179 closes while the valve 181 remains closed so as to cause the chamber to be filled with a measured quantity of nuts. When the valves are in their positions shown by Fig. 6 the lower valve 181 is open while the valve 179 still remains closed, which will cause the measured quantity of nuts to be discharged from the chamber into a chute 183 above the container so as to charge the basket with nuts while it is above the container and is descending during its cycle of operations.

As shown, the lower valve 181 is formed with a downwardly inclined terminal portion 185, the free end of which when the valve is closed coacts with a plate 187 (Fig. 3) extending from the lower edge of the wall 175 of the chamber 177 to the top of the corresponding wall of the chute 183, the space at the upper side of the inclined portion 185 and the lower edges of the walls of the chamber 177 in effect forming part of that chamber, as clearly shown in Fig. 3. This inclined portion 185 of the lower valve also acts to direct the nuts being discharged from the chamber 177 into the chute 183. When the lower valve is open the inclined portion 185 thereof coacts with a flange 189 at the upper transverse edge of the chute 183 also to direct the nuts into the chute, as clearly shown in Fig. 6.

The two valves 179 and 181 are mounted for reciprocation in longitudinally extending grooves 191 (Figs. 3 and 12) formed in the inner side surfaces of the side plates 19 and 39. The valves are operated through their cycle by the sleeves 7I while the latter is rotating for moving the basket through its cycle. For this purpose the upper valve 179 is formed with elongated slots 193 and 195 (Figs. 2, 3 and 12). The slot 193 has closed ends, and cooperating with it is a radially extending cam arm 197 (Figs. 2 and 3) formed integrally with the sleeve 71. When the parts are in their normal positions shown by Figs. 2 and 3, and the sleeve is then shifted downward, as viewed in Fig. 2, by the cams on the gear 85 to cause the sleeve to rotate, the cam arm 197 is caused to lie beneath the slot 193. Rotation of the sleeve in the direction of the arrows shown in Figs. 3 and 4 from its position shown in Fig. 3 to that shown in Fig. 4 causes the end of the cam arm to enter the slot 193, and, by engaging the left hand closed end of that slot, as viewed in Figs. 3 and 4, push the valve to its open position shown in Fig. 4.

The sleeve 71 also is integrally formed with a radially projecting segmental member 199 (Figs. 2 and 3) which carries a roller 201, the peripheral surface of the segment being concentric with the sleeve. This peripheral surface and roller 201 cooperate with a swinging arm 203 pivotally mounted at 205, on the platform 3. The arm 203 in turn cooperates with a roller 207 carried at the end of one leg 209 of a bell crank lever, the other leg 211 of which lever extends into the slot 195 in the upper valve 179 and is adapted to bear against the closed right hand end of said slot, as viewed in Fig. 2. The bell crank lever 209, 211 is pivotally mounted at 213, on a bracket 215 carried by the side plate 39. When the sleeve 71 rotates from its position shown by Fig. 3 to that shown by Fig. 4 the roller 201 on the segment 199 is brought into engagement with the arm 203, and continued rotation of the sleeve causes that arm to swing to the right to cause it to rock the bell crank lever 209, 211 to the right to push the upper valve 179 into its closed position shown by Fig. 5. Continued rotation of the sleeve from its position shown by Fig. 5 causes the peripheral surface of the segment 199 to bear against the arm 203, as shown in Fig. 6, to hold the valve 179 in its closed position until the cam arm 197 again enters the slot 193 to move the valve into its open position in the way above described.

The lower valve 181 is provided with a pair of spaced extensions 217 (Fig. 11) each of which carries an upstanding pin 219. The pin 219 of the lower extension, as viewed in Fig. 11, is received by the slot 221 formed in the end of a link 223, the other end of which latter is pivotally connected at 225, to a plate 227 (Figs. 3 and 11) carried by and extending between the opposite side plates 19 and 29. The other pin 219 is received by the slot 229 formed in the end of a link 231, the other end of which link is pivotally connected at 233, to an intermediate portion of the link 223. Cooperating with the link 231 adjacent its connection 233 to the link 223 is a downwardly extending arm 235 (Figs. 3 and 11) carried by a rock shaft 237 journaled at opposite ends in the side plates 19 and 39. This rock shaft also carries a radially projecting arm 239 adapted to cooperate with the cam arm 197 on the sleeve 71. After the upper valve 179 has been closed by the cam arm 197 continued rotation of the sleeve causes that arm to engage with the arm 239 on the rock shaft 237 and turn the rock shaft to cause the arm 235 carried by it to engage the link 231 and move the valve 181 into its open position shown by Fig. 6. The arrangement of these links causes the motion of the arm 235 imparted to the valve to be multiplied so that the valve is open quickly.

Continued rotation of the sleeve 71 from its position shown in Fig. 6 will cause the cam arm 197 to engage the block 241 carried by the lower valve 181 at its upper side to move the valve from its open position shown by Fig. 6 to its closed position shown by Fig. 3.

As illustrated (see Figs. 2, 2a and 3), the upper valve 179 when it is in its closed position shown by Fig. 3 is in engagement with the downturned ends 243 of a row of spring fingers 245 positioned at the outer side of the wall 175 of the chamber 177 which receives the nuts discharged from the hopper. These fingers, as illustrated, are mounted at their lower ends on a horizontal bar 247 to which they are preferably welded, that bar being secured in any suitable manner, say by screws 249, to the wall 175 adjacent its lower edge. When the chamber 177 is filled with nuts, and the valve 179 is closed, that valve must move through a mass of nuts. A nut which may be caught between the advancing edge of the valve in the downturned portion 243 of any of the fingers will cause that finger to flex to the right, as viewed in Fig. 3, and thus prevent the nut being cut in halves or otherwise multilated by the valve. When the valve opens a nut so caught will fall into the chamber 177 with the rest of the nuts entering the chamber from the hopper.

It will be understood that within the scope of the appended claims wide deviations may be made from the form of the invention described without departing from the spirit of the invention.

I claim:

1. A cooking machine having, in combination, a container for hot cooking liquid, a basket for the articles to be cooked, mechanism for moving the basket through a cycle which removes it from such liquid and replaces it therein, a motor for operating said mechanism, a timing device driven by said motor for placing the latter operatively in driving relation to said mechanism at successive intervals, each longer than the time required to move said basket through one of its cycles, for moving said basket through a single cycle at the beginning of each of said intervals, and operator controlled means for regulating said timing device for varying the duration of said intervals.

2. A cooking machine according to claim 1 in which the timing device comprises a plurality of cams driven by the motor and a cam follower for placing the motor in driving relation to the mechanism for moving the basket, the operator controlled means comprising mechanism for shifting the cam follower for causing it to cooperate with selected groups of said cams.

3. A cooking machine having, in combination, a container for hot cooking liquid, a basket for the articles to be cooked, mechanism for moving the basket through a cycle which removes it from such liquid and replaces it therein, a motor for operating said mechanism, mechanism operated by said motor for placing the latter at timed intervals in driving relation to said mechanism for moving the basket, which mechanism operated by said motor comprises a part shiftable by the operator into selected positions for varying the time elapsing between said intervals.

4. A cooking machine having, in combination, a container for hot cooking liquid, a basket for the articles to be cooked, mechanism for moving the basket through a cycle which removes it from such liquid and replaces it therein, a substantially constant speed motor, mechanism driven by said motor for intermittently operatively connecting it to the basket moving mechanism for moving the basket through single cycles at timed intervals, said mechanism driven by the motor comprising relatively shiftable parts under the control of the operator for varying the duration between said intervals.

5. A cooking machine having, in combination, a container for hot cooking liquid, a basket for the articles to be cooked, mechanism for moving the basket through a cycle which removes it from such liquid and replaces it therein, a continuously rotated shaft, shiftable means for intermittently connecting said shaft in driving relation to said mechanism, and mechanism driven by said shaft for operating said shiftable means for so connecting said shaft.

6. A cooking machine having, in combination, a container for hot cooking liquid, a basket for the articles to be cooked, mechanism for moving the basket through a cycle which removes it from such liquid and replaces it therein, a continuously rotated shaft, shiftable means for intermittently connecting said shaft in driving relation to said mechanism, mechanism comprising a plurality of cams driven by said shaft and a cooperating cam follower for operating said shiftable means, and means under the control of the operator for positioning said cam follower to cause it to be operated by selected cams of said plurality of cams for varying the duration between operations of the basket through its cycles.

7. A cooking machine having, in combination, a container for hot cooking liquid, a basket for the articles to be cooked, mechanism for moving the basket through a cycle which removes it from such liquid and replaces it therein, a continuously rotated shaft, shiftable means for intermittently connecting said shaft in driving relation to said mechanism, a plurality of relatively angularly spaced radially extending cams rotated by said shaft about a common axis, which cams terminate at different distances from said axis, a cam follower adapted to be actuated by said cams for operating said shiftable means, and means under the control of the operator for positioning said cam follower at different distances from said axis for causing one or more of said cams to operate it.

8. A cooking machine having, in combination, a container for hot cooking liquid, a basket for the articles to be cooked, mechanism for moving the basket through a cycle which removes it from such liquid and replaces it therein, a continuously rotated shaft, shiftable means for intermittently connecting said shaft in driving relation to said mechanism, a spring for urging said shiftable means in one direction, a cam driven by said shaft for moving said shiftable means in the opposite direction against the force of the spring to a position in which it so connects said shaft, and mechanism cooperating with said shiftable means for holding it in that position against the force of said spring while the shaft drives the basket through one cycle and thereupon releasing it for causing the spring to move it to a position in which it is disconnected from said shaft.

9. A cooking machine having, in combination, a container for hot cooking liquid, a basket for the articles to be cooked, mechanism for moving the basket through a cycle which removes it from such liquid and replaces it therein, a rotary shaft, a part for operating said mechanism for moving the basket through one of said cycles during one revolution of said shaft, which part is splined to said shaft and is shiftable along it into and out of cooperating relation with said mechanism, and means operated by said shaft for moving said part into such cooperating relation and thereafter moving it out of such relation at the end of one revolution of said shaft.

10. A cooking machine according to claim 9 in which the means operated by the shaft for moving along it the part splined thereto comprises a plurality of timing cams driven by the shaft and a cam follower cooperating with said timing cams, and means under the control of the operator for positioning said cam follower to cause it to be operated by selected cams of said timing cams for varying the duration between operations of the basket through its cycles.

11. A cooking machine according to claim 9 in which the means operated by the shaft for moving along it the part splined thereto comprises a plurality of relatively angularly spaced radially extending timing cams rotated by said shaft about a common axis, which timing cams terminate at different distances from said axis, a cam follower adapted to be actuated by said timing cams for shifting along the shaft the part splined thereto, and means under the control of the operator for positioning said cam follower at different distances from said axis for causing one or more of said timing cams to operate it.

12. A cooking machine having, in combination, a container for hot hooking liquid, a basket for the articles to be cooked, mechanism for moving the basket through a cycle which removes it from such liquid and replaces it therein, a rotary shaft, a part for operating said mechanism for moving the basket through one of said cycles during one revolution of said shaft, which part is splined to said shaft and is shiftable along it into and out of cooperating relation with said mechanism, a spring for urging said part in one direction along said shaft, mechanism actuated by said shaft for moving said part in the opposite direction against the force of said spring to a position in which said part is in its cooperating relation with said mechanism for moving the basket, and a further mechanism for holding said part in that position while the basket moves through one cycle and thereupon releasing it for permitting the spring to move said part out of such position.

13. A cooking machine having, in combination, a container for hot cooking liquid, a basket for the articles to be cooked, basket operating mechanism for moving the basket through a cycle which removes it from such liquid and replaces it therein, article charging mechanism for entering articles into said basket when the latter is removed from said liquid during such cycle, a continuously rotated motor, a first rotary part, which latter is in continuous driven relation to said motor and is adapted for intermittent connection to said basket operating mechanism for causing said motor to move said basket at intervals through successive single cycles, a second rotary part, which latter is adapted for intermittent connection to said motor for causing said motor intermittently to operate said article charging mechanism, and mechanism operated by said motor for intermittently connecting said first part to said basket operating mechanism and said second part to said motor.

14. A cooking machine having, in combination, a container for hot cooking liquid, a basket for the articles to be cooked, basket operating mechanism for moving the basket through a cycle which removes it from such liquid and replaces it therein, article charging mechanism for entering articles into said basket when the latter is removed from said liquid during such cycle, a continuously rotated motor, a first rotary part, which latter is in continuous driven relation to said motor and is adapted for intermittent connection to said basket operating mechanism for causing said motor to move said basket at intervals through successive single cycles, a second rotary part, which latter is adapted for intermittent connection to said motor for causing said motor intermittently to operate said article charging mechanism, and mechanism operated by said motor for intermittently connecting said first part to said basket operating mechanism and said second part to said motor, the last-mentioned mechanism comprising a timing device which is regulatable by the operator for varying the duration of the intervals between successive operations of the basket operating and article charging mechanisms.

15. A cooking machine having, in combination, a container for hot cooking liquid, a basket for the articles to be cooked, basket operating mechanism for moving the basket through a cycle which removes it from such liquid and replaces it therein, article charging mechanism for entering articles into said basket when the latter is removed from said liquid during such cycle, a continuously rotated motor, a first rotary part, which latter is in continuous driven relation to said motor and is adapted for intermittent connection to said basket operating mechanism for causing said motor to move said basket at intervals through successive single cycles, a second rotary part, which latter is adapted for intermittent connection to said motor for causing said motor intermittently to operate said article charging mechanism, and mechanism operated by said motor for intermittently connecting said first part to said basket operating mechanism and said second part to said motor, the last mentioned mechanism comprising a plurality of rotary cams driven by said motor and a cooperating cam follower adapted for actuation thereby for so connecting said basket operating and article charging mechanisms, said cam follower being mounted for manual shifting by the operator for causing it to be actuated by one or more of said cams.

16. A cooking machine having, in combination, a container for hot cooking liquid, a basket for the articles to be cooked, basket operating mechanism for moving the basket through a cycle which removes it from such liquid and replaces it therein, article charging mechanism for entering articles into said basket when the latter is removed from said liquid during such cycle, a continuously rotated shaft, a part adapted to drive said basket operating mechanism, which part is splined to said shaft for movement along it into and out of driving relation with said basket operating mechanism, a clutch element fixed to said shaft, a sleeve-like part adapted to drive said article charging mechanism, which sleeve-like part is provided with a clutch element and is slidable on said shaft for moving its clutch element into and out of engaged relation with said clutch element fixed to said shaft, and mechanism continuously driven with said shaft for intermittently causing said part splined to said shaft and said sleeve-like part to be moved along said shaft into and out of such relations.

17. A cooking machine having, in combination, a container for hot cooking liquid, a basket for the articles to be cooked, basket operating mechanism for moving the basket through a cycle which removes it from such liquid and replaces it therein, article charging mechanism for entering articles into said basket when the latter is removed from said liquid during such cycle, a continuously rotated shaft, a part adapted to drive said basket operating mechanism, which part is splined to said shaft for movement along it into and out of driving relation with said basket operating mechanism, a clutch element fixed to said shaft, a sleeve-like part adapted to drive said article charging mechanism, which sleeve-like part is provided with a clutch element and is slidable on said shaft for moving its clutch element into and out of engaged relation with said clutch element fixed to said shaft, and mechanism continuously driven with said shaft for intermittently causing said part splined to said shaft and said sleeve-like part to be moved along said shaft into and out of such relations, the last mentioned mechanism comprising a timing device which is regulatable by the operator for varying the duration of the intervals between successive operations of the basket operating and article charging mechanisms.

18. A nut cooking machine comprising a nut hopper, a cooking basket, means for charging the basket with measured quantities of nuts from said hopper comprising walls forming a chamber communicating with said hopper, a pair of valves, one for controlling the discharge of nuts from said chamber and the other the entrance of nuts into said chamber from the hopper when the first mentioned valve is closed, the second mentioned valve being a sliding valve whereby when it is moved to close it the advancing forward edge thereof passes through a mass of nuts, and a row of relatively narrow spring fingers positioned to cooperate with said edge of said last mentioned valve when it is closed, which fingers are adapted to flex independently of each other to prevent cutting of nuts which may be caught between them and said edge.

LESLIE W. CURRIER, Jr.

No references cited.